R. E. KIDDER.
DIE PRESS.
APPLICATION FILED APR. 16, 1910.

967,526.

Patented Aug. 16, 1910.

Witnesses.
R. D. Holman.
Penelope Cumberbach.

Inventor
Richard E. Kidder.
By Rufus B. Fowler
Attorney

THE NORRIS PETERS CO., WASHINGTON, D. C.

UNITED STATES PATENT OFFICE.

RICHARD E. KIDDER, OF WORCESTER, MASSACHUSETTS.

DIE-PRESS.

967,526.  Specification of Letters Patent. Patented Aug. 16, 1910.

Application filed April 16, 1910. Serial No. 555,907.

*To all whom it may concern:*

Be it known that I, RICHARD E. KIDDER, a citizen of the United States, residing at Worcester, in the county of Worcester and Commonwealth of Massachusetts, have invented a new and useful Improvement in Die-Presses, of which the following is a specification, accompanied by drawings forming a part of the same.

My present invention relates to that class of die presses in which a reciprocating head is employed to force a cutting die through cloth, paper, or similar material, for the purpose of cutting the latter into any desired shape, corresponding with the shape of the cutting die, such, for example, as cutting envelop blanks, in which operation a pile of paper is laid upon a supporting table, and the cutting die placed upon the pile and forced through the mass of paper by the downward movement of the reciprocating head.

The nature of my present invention is hereinafter described and illustrated in the accompanying drawings, the novel features being pointed out in the annexed claims.

Figure 1:
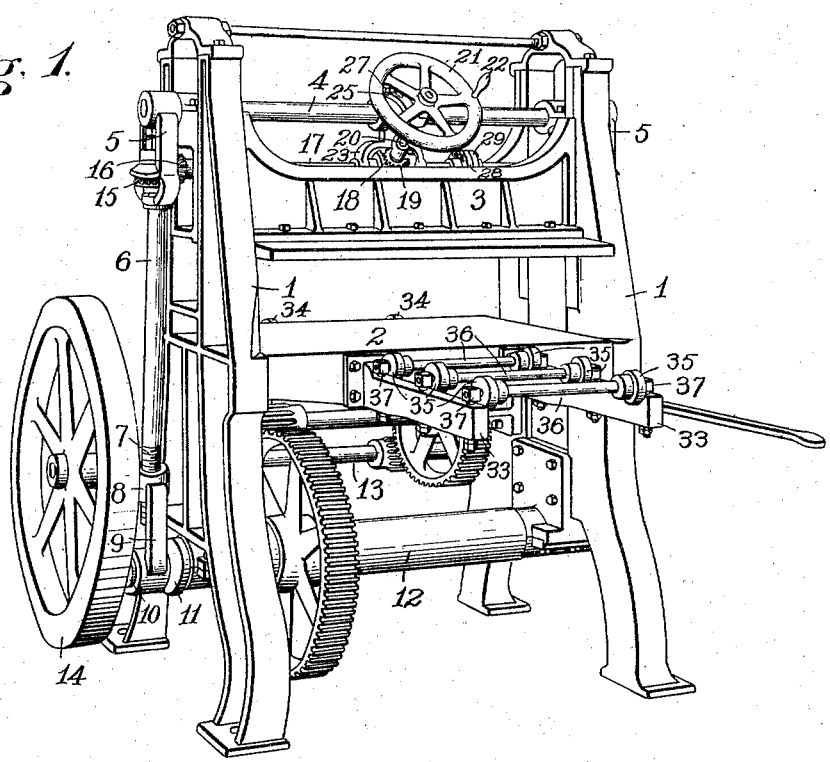
Figure 2:
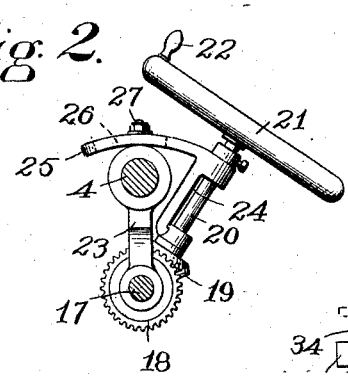
Figure 3:
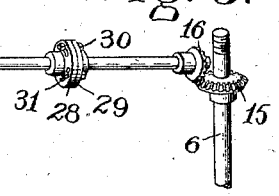
Figure 4:
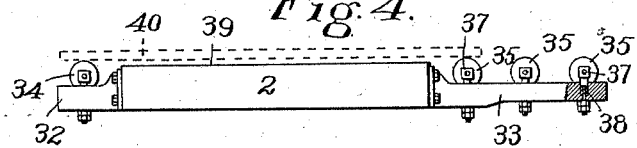

Referring to the accompanying drawings, Figure 1 represents a perspective view of a die press embodying my invention. Figs. 2 and 3 are detached portions of the operating mechanism. Fig. 4 is a detached side view of the supporting table showing the connection therewith of the spring actuated friction rolls.

Similar reference characters refer to similar parts in the different figures.

The die press embodying my invention comprises two side frames 1, 1, between which is supported a table 2 for supporting the work to be cut. Vertically movable in suitable ways in the side frames 1, 1, is a reciprocating head 3 provided with bearings for a shaft 4. Attached to the outer ends of the shaft 4 are yokes 5, 5, in the lower ends of which are journaled connecting rods 6, one upon each side of the machine. The lower ends of the connecting rods 6 are screw threaded, as shown at 7, and enter the screw threaded hubs 8 in the yokes 9 which are journaled upon crank pins 10 carried in the disks 11 on a main driving shaft 12. One of the connecting rods with the yokes 5 and 9 are shown in Fig. 1, the corresponding rod and yokes upon the opposite side of the machine which are not shown in Fig. 1 being duplicates. The shaft 12 has a geared connection with a shaft 13 to which power is applied by any suitable means, and upon which is preferably mounted a balance wheel 14.

As the shaft 12 rotates a vertically reciprocating motion will be imparted to the head 3. The connecting rods 6, 6, above their upper journal bearings are provided with bevel gears 15 which are engaged by beveled pinions 16 on a shaft 17 parallel with the shaft 4. The shaft 17 is provided with a bevel gear 18 in mesh with a bevel gear 19 carried upon the lower end of a short shaft 20, the upper end of which is provided with a hand wheel 21 having a crank handle 22 to enable the operator to rotate the shaft 17 at will. The two shafts 4 and 17 are connected by a yoke 23, and the shaft 20 is journaled in a frame 24 from which extends a plate 25 curved concentrically with the shaft 17 and having a slot 26, through which a screw 27 extends into the yoke 23 for the purpose of rigidly clamping the plate 25 to the yoke 23 in any desired position, so as to allow an adjustment of the hand wheel 21 at an angle convenient for the operator.

By rotating the hand wheel 21 the shaft 17 will be rotated through the gears 18 and 19 and through the gears 16 and 15 the connecting rods 6 will be rotated within their screw threaded engagements with the hubs 8. If the rods 6 are turned in the proper direction to screw them into the hubs 8 the distance between the shafts 12 and 4 will be reduced and the reciprocating head 3 correspondingly lowered. If the connecting rods 6, 6, are rotated in the opposite direction, viz., to screw them out of the hubs 8, the distance between the shafts 12 and 4 will be correspondingly increased, thereby raising the reciprocating head 3.

The shaft 17 is made in two sections carrying disks 28, 29, which are connected by bolts 30, said bolts passing through concentric slots 31 in one of the disks to allow a slight rotative adjustment between the two sections of the shaft 17, in order to enable the gears 16, 16, to be brought into proper mesh with the gears 15, 15. The table 2 is provided on the front and rear sides with projecting arms 32, 33, the arms 32 forming a support for the friction rolls 34, and the arms 33 forming a similar support for the friction rolls 35, all of said rolls being carried on shafts 36 which are journaled in the upper ends of studs 37 passing through holes in the arms 32 and 33, and being held in a raised position by means of spiral springs 38 which hold the friction rolls with their peripheries extending in a plane slightly above the upper surface 39 of the table 2. The material to be cut is supported upon a board 40 which extends across the table 2 and supported at its opposite edges upon the rolls 34 and upon the rolls 35 nearest the table. As the head 3 descends to carry the cutting die through the material to be cut the board 40 is depressed, forcing the friction rolls beneath it downward and compressing their lifting springs 38. When the pressure of the die is removed the tension of the springs 38 tends to lift the board 40 from the table 2, and thereby reduce the friction between the board 40 and the upper surface of the table 2 when the former is being removed.

I claim,

1. In a die press, the combination with a vertically reciprocating head, and a work supporting table, of means for varying the position of said head relatively to said work supporting table, comprising a rotatable shaft, a short shaft having a geared connection with said rotatable shaft, a hand wheel carried by said short shaft, a frame supporting said short shaft, and means for adjustably holding said frame in a desired position.

2. In a die press, a vertically reciprocating head, a pair of actuating cranks therefor, means for varying the distance between said cranks and said head, comprising a horizontal rotatable shaft, a frame, capable of an angular adjustment about the axis of said horizontal shaft, a shaft journaled in said frame having a geared connection with said horizontal shaft and provided at one end with a hand wheel, and means for adjusting said frame about the axis of said horizontal shaft.

3. In a die press, a vertically reciprocating head, means for adjusting the position of said head vertically, comprising a short shaft provided at one end with a hand wheel, a supporting frame for said shaft, and means for adjusting the frame to vary the vertical elevation of said hand wheel.

4. In a die press, a vertically reciprocating head, a pair of cranks for actuating said head, screw threaded links between said head and said cranks, means for imparting a rotative movement to said links comprising a shaft having a geared connection with each of said links, a beveled pinion attached to said shaft, a frame capable of a swinging movement about the axis of said pinion, a shaft journaled in said frame and provided with a gear at one end in mesh with the pinion on said horizontal shaft, and a hand wheel at the opposite end, and means for adjusting the position of said frame.

RICHARD E. KIDDER.

Witnesses:
PENELOPE COMBERBACH,
NELLIE WHALEN.